(12) United States Patent
Morgus et al.

(10) Patent No.: US 11,843,302 B2
(45) Date of Patent: Dec. 12, 2023

(54) DUAL VOICE COIL LINEAR TRANSLATOR

(71) Applicant: Thorlabs, Inc., Newton, NJ (US)

(72) Inventors: Tyler Morgus, Newton, NJ (US);
Brian Mitchell, Newton, NJ (US);
John Cherny, Newton, NJ (US)

(73) Assignee: Thorlabs, Inc., Newton, NJ (US)

( * ) Notice: Subject to any disclaimer, the term of this patent is extended or adjusted under 35 U.S.C. 154(b) by 0 days.

(21) Appl. No.: 17/024,165

(22) Filed: Sep. 17, 2020

(65) Prior Publication Data

US 2021/0091650 A1    Mar. 25, 2021

(51) Int. Cl.
*H02K 41/03* (2006.01)
*H02K 41/035* (2006.01)

(52) U.S. Cl.
CPC ............................. *H02K 41/0356* (2013.01)

(58) Field of Classification Search
CPC ...... H02K 41/00; H02K 41/03; H02K 41/035; H02K 41/0356; G02B 7/00; G02B 7/005; G02B 7/02; G02B 7/023; G03F 9/00; G03F 9/70; G03F 9/701; G03F 9/7011
See application file for complete search history.

(56) References Cited

U.S. PATENT DOCUMENTS

| 4,601,539 | A | | 7/1986 | Watanabe | |
|---|---|---|---|---|---|
| 5,777,403 | A | * | 7/1998 | Yuan | H02K 41/0356 310/12.24 |
| 5,890,967 | A | * | 4/1999 | Allen | A63B 57/405 473/178 |
| 6,320,707 | B1 | | 11/2001 | Khoshnevisan et al. | |
| 8,922,070 | B2 | * | 12/2014 | Hunstable | H02K 35/04 310/20 |

(Continued)

FOREIGN PATENT DOCUMENTS

| CN | 105763021 | * | 7/2016 |
|---|---|---|---|
| CN | 109562413 A | | 4/2019 |
| JP | 3611824 | * | 1/2005 |

(Continued)

OTHER PUBLICATIONS

First Office Action and Search Report issued by the China National Intellectual Property Administration for corresponding Chinese Patent Application No. 202010990140.3, dated Sep. 10, 2021, with English translation attached.

(Continued)

*Primary Examiner* — Tran N Nguyen
(74) *Attorney, Agent, or Firm* — MYERS WOLIN, LLC

(57) ABSTRACT

A linear translator device, including: a first body; a second body; and a plurality of actuators; wherein each actuator includes a first part first part mounted to the first body and a second part is mounted to the second body, the first part includes a front end and a back end, the second part is configured to extend and retract parallel to the direction of motion; wherein the plurality of actuators are arranged so that the extending or retracting direction of the second part of one of the plurality of actuators is offset, parallel and opposite to that of another one of the plurality of actuators; and wherein at least a portion of the first part of the one of the plurality of actuators overlaps with a portion of the first part of the other one of the plurality of actuators in the direction of motion space.

7 Claims, 5 Drawing Sheets

(56) References Cited

U.S. PATENT DOCUMENTS

2012/0177354 A1    7/2012   Ashizawa et al.
2012/0262259 A1   10/2012   Teo et al.

FOREIGN PATENT DOCUMENTS

| JP | 3689949 B2 | * | 8/2005 | ............... G03F 9/70 |
| JP | 2011-163167 A | | 8/2011 | |
| JP | 5887278 | * | 3/2016 | ............. H02K 41/03 |
| TW | M517951 U | | 2/2016 | |

OTHER PUBLICATIONS

European Search Report and Written Opinion issued by the European Patent Office for corresponding European Patent Application No. 20 196 458.2, dated Jan. 26, 2021.

Second Office Action issued by the China National Intellectual Property Administration for Chinese Patent Application No. 202010990140.3, dated Mar. 3, 2022, with English translation attached.

\* cited by examiner

Dual Voice Coil Design in Line

DUAL VOICE COIL LINEAR TRANSLATOR

CROSS REFERENCE TO RELATED APPLICATIONS

This application claims the benefit of U.S. Provisional Patent Application No. 62/903,215 filed on Sep. 20, 2019. The contents of U.S. Provisional Patent Application 62/903,215 are hereby incorporated by reference.

FIELD OF THE INVENTION

The present invention relates to actuators, and more specifically to a dual voice coil linear translator.

BACKGROUND

Voice coil stage is a high performance, and compact positioning system specifically developed for applications requiring both high precision and high-speed positioning over a short to medium stroke. It is ideal for optical focusing and other micro-positioning applications such as semiconductor, medical, optical testing, scanning microscopy, circuit board assembly and micro manufacturing.

A voice coil includes two basic parts; a permanent magnet assembly and an electromagnetic coil. The voice coil may be a moving magnet or moving coil design. The coil moves in and out of the magnet assembly based on an electric current applied to the coil. As shown in FIG. 1, when the voice coil is fully collapsed, the collapsed length of the voice coil is represented as $X+Z$ (length of the housing plus the length of the mount head). Then, when the voice coil is fully extended, the extended length of the voice coil is represented as $X+Y+Z$, where Y is the maximum extent of travel. Thus, depending on the applied current, the length of the voice coil is between $X+Z$ and $X+Y+Z$.

FIG. 2 illustrates a dual voice coil design in which two voice coils of FIG. 1 are arranged with their orientations opposite to each other along their common line of extension. Since there are two voice coils, the collapsed length of the dual voice coil is $2(X+Z)$ and the extended length of the dual voice coil is $2(X+Y+Z)$.

Note that X is greater than Y. Individual voice coil actuators tend to have an overall length 20% greater than the desired travel length in the retracted telescoped state. As an example the single traditional voice coil translator to translate 100 mm would need a 120 mm long voice coil and to which the travel range must be added resulting in a 220 mm overall minimum device length. However, space saving is a concern in many applications when it comes to devices and translators which need to be precisely placed for experimental setups or are to be incorporated into larger devices as sub-assemblies. Before this translator, voice coil driven linear devices were powered by one or more voice coils where the length of the coil was typically equal to or greater than the desired translation range of the device. Thus, the length of the device was typically greater than twice the translation range of the device.

Therefore, there is a long-felt need for creating a translating device driven by two or more voice coil actuators where the displacement of the device exceeds the length of any of the voice coils used in the device. To meet this need, for the same desired travel length, the device would have a shorter overall device length than existing devices.

SUMMARY

An embodiment of the present invention provides a linear translator device, including: a first body; a second body movable along a direction of motion relative to the first body; and a plurality of actuators; wherein each actuator includes a first part and a second part, the first part is mounted to the first body and the second part is mounted to the second body, the first part includes a front end and a back end, the second part is configured to extend and retract relative to the front end of the first part parallel to the direction of motion; wherein the plurality of actuators are arranged so that the extending or retracting direction of the second part of one of the plurality of actuators is offset, parallel and opposite to that of another one of the plurality of actuators; and wherein at least a portion of the first part of the one of the plurality of actuators overlaps with a portion of the first part of the other one of the plurality of actuators in the direction of motion space.

DETAILED DESCRIPTION OF THE PREFERRED EMBODIMENTS

Figure 1:
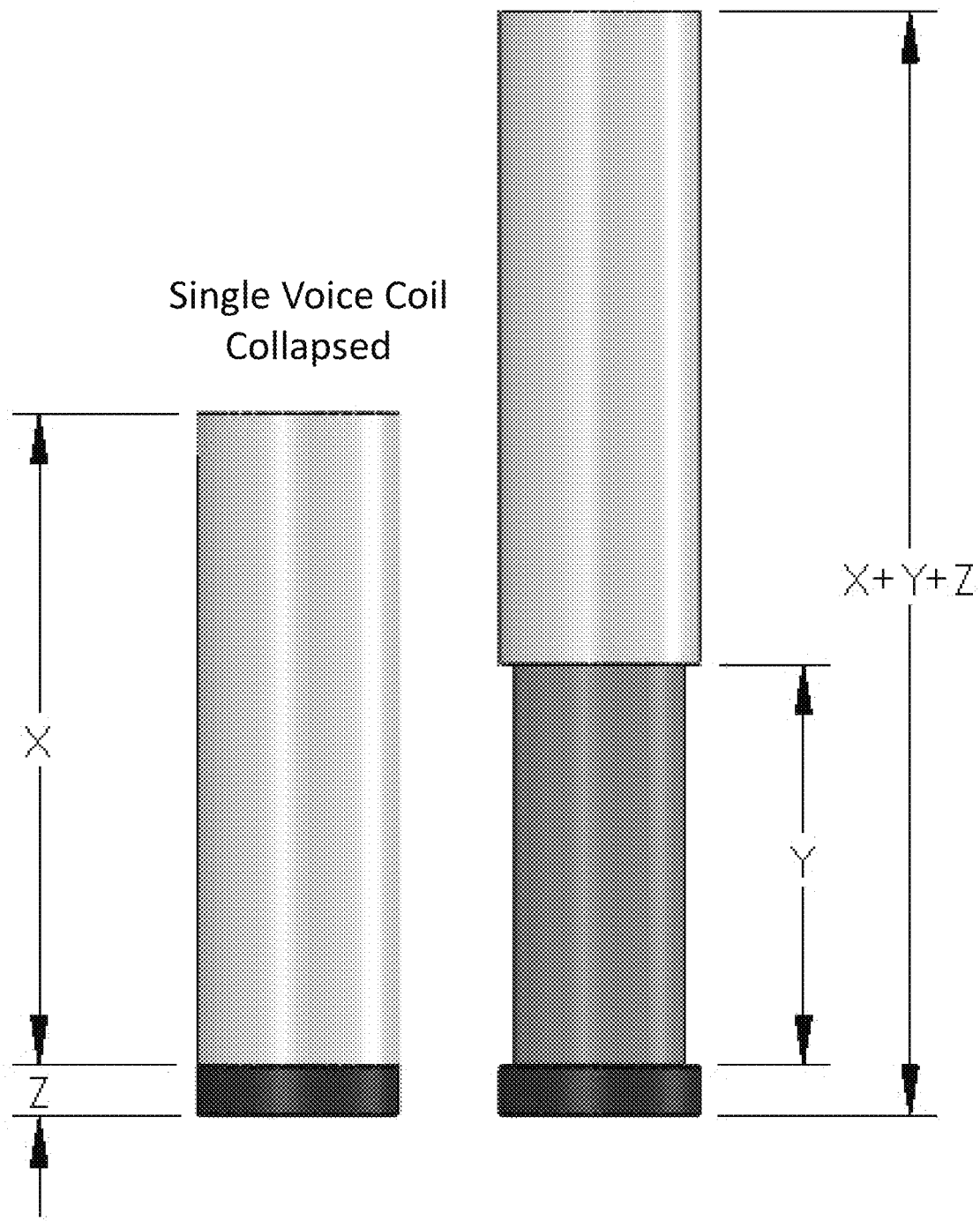
FIG. 1 illustrates a single voice coil in the collapsed state and extended state.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

An embodiment of the present invention provides an actuator driven device which uses two or more linear actuators where at least one actuator is oriented opposed and offset from one of the other actuators in the device, parallel to the axis of motion. In the following discussion, a voice coil linear actuator is used in various example embodiments for illustrating the inventive concept. It is understood that the concept of arranging the actuators in the specific way according to an embodiment of the present invention is not limited to voice coil actuators only. Other types of linear actuators are also contemplated to make use of the unique advantage of the actuator arrangements according to the embodiments disclosed in this document.

Traditional voice coil translators utilize one or more voice coils where all the coils share the same orientation. Individual voice coil actuators tend to have an overall length 20% greater than the desired travel length in the retracted telescoped state. As an example, the single traditional voice coil translator to translate 100 mm would need a 120 mm long voice coil and to which the travel range must be added resulting in a 220 mm overall minimum device length.

Figure 2:
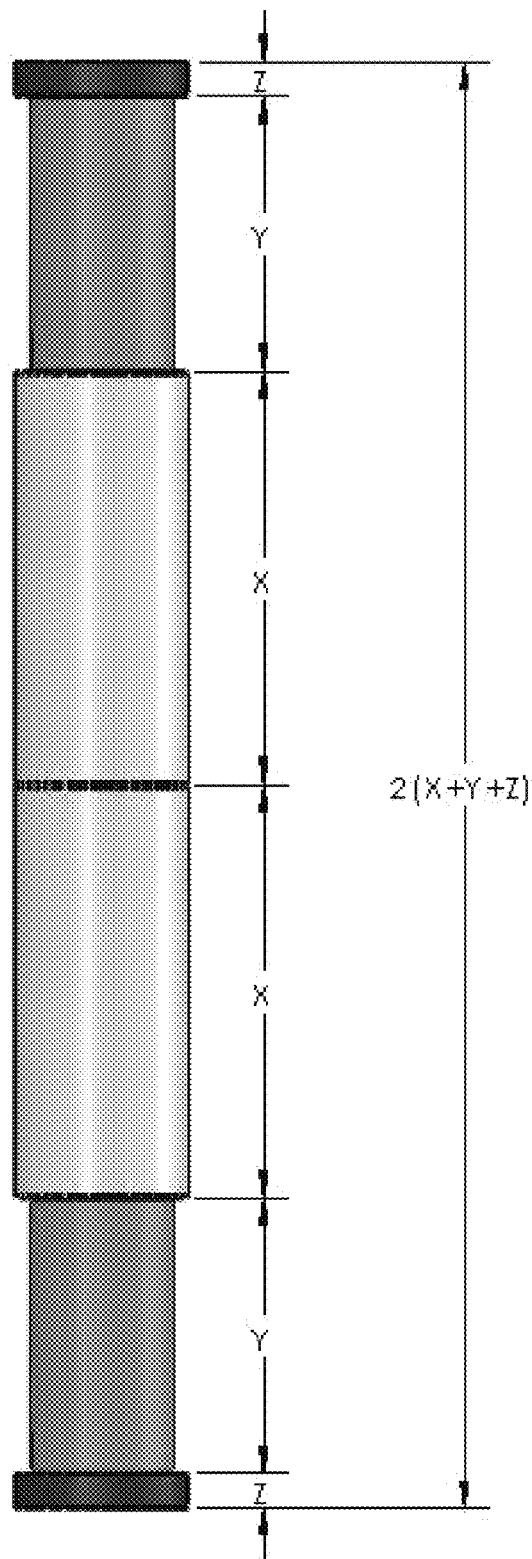
FIG. 2 illustrates an existing dual voice coil design.
Figure 3:
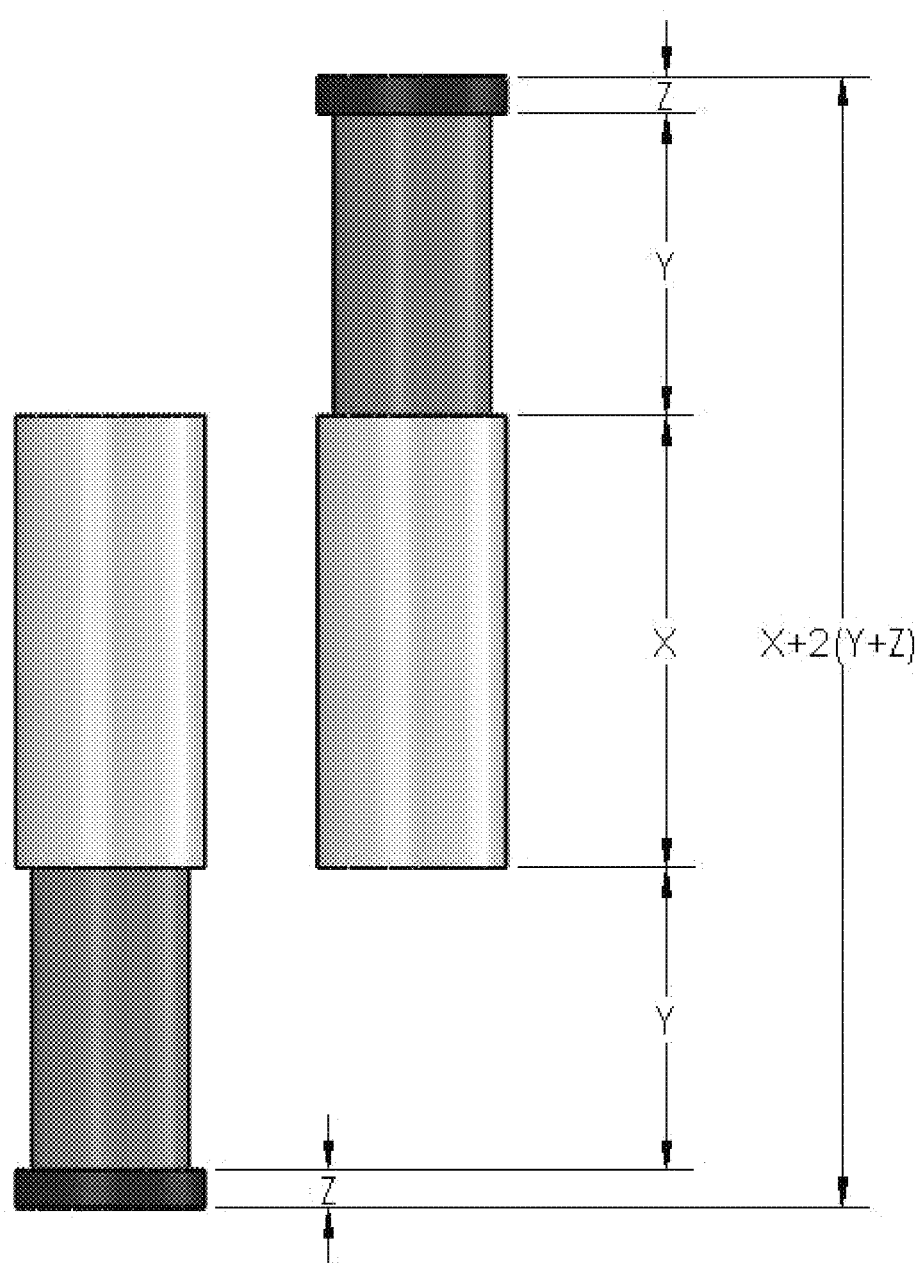
FIG. 3 illustrates a dual voice coil design according to an embodiment.

An embodiment of the present invention provides a voice coil powered device which uses two or more voice coil actuators where at least one actuator is oriented opposed and offset from one of the other actuators in the device, parallel to the axis of motion. FIG. 3 illustrate the spacing saving achieve by the design according to an embodiment. As can be seen from FIG. 3, the housing of the two voice coils overlap in the vertical direction space. Thus, the extended length of the dual voice coil is X+2(Y+Z), where Z is the thickness of the mount head of voice coil. Compare to FIG. 2, the design according an embodiment realizes a space saving over the device length of 2(X+Y+Z) as shown in FIG. 2. In many applications, the value of Z is negligible compared to the values of X and Y, and the space saving is almost the full length of housing X.

As an example, the single traditional voice coil translator to translate 100 mm would need a 120 mm long voice coil and to which the travel range must be added resulting in a 220 mm overall length minimum device length. To achieve the same 100 mm travel range with the dual voice coil configuration described above requires two 76.2 mm voice coil actuators parallel to each other. Added to this is the 100 mm travel, resulting in a total of 176.2 mm minimum. This is a 19.91% in space savings than the existing design. This example is simplified and assumes ideal conditions when in reality longer voice coils may be needed specifically in the single voice coil stage configuration. This is the reason a 76.2 mm voice coil actuator is used over a 50 mm voice coil in the example.

Figure 4:
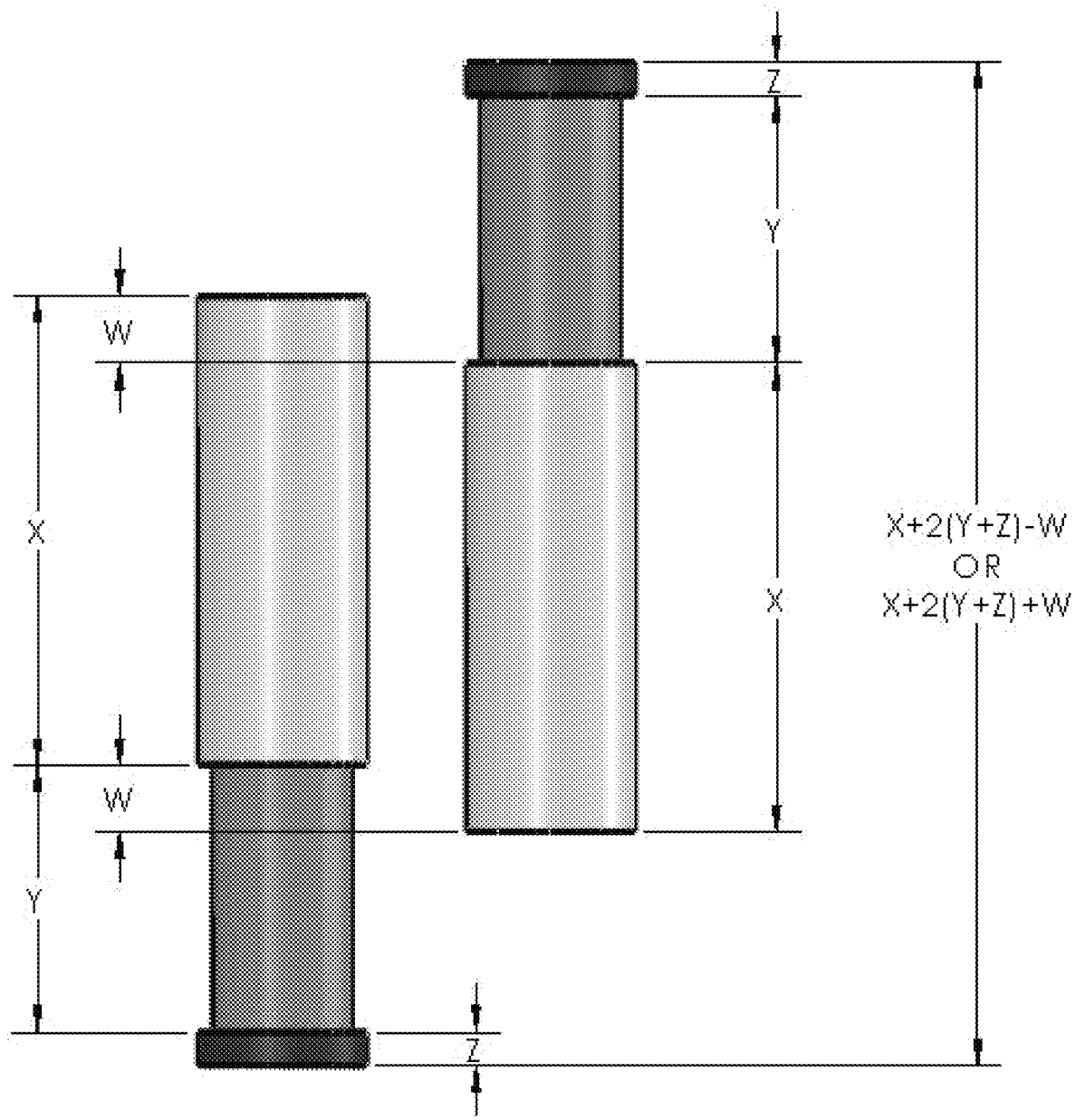
FIG. 4 illustrates a dual voice coil design according to an embodiment where the back and front of a plurality of voice coil actuator sides are offset but space is still conserved

For ease of discussion of the movements of parts, the terms "fixed" and "moving" are used herein. Note that the terms "fixed" and "moving" are relative terms. Depending on the frame of reference, an object may be considered "fixed" or "moving" relative to another object. FIG. 4 shows an embodiment where the front end of the fixed/moving part of one of the plurality of actuators is offset where space remain conserved from the back end of the other one of the plurality of actuators. Here, the space saving is realized from the partial or fully overlapping of the housings in the direction of motion space. If the value of the offset is W, then the extended length of the dual voice coil is X+2(Y+Z)−W, or X+2(Y+Z)+W, depending on whether the offset of the fixed part is in the extending or retracting direction of the moving part.

Figure 5:
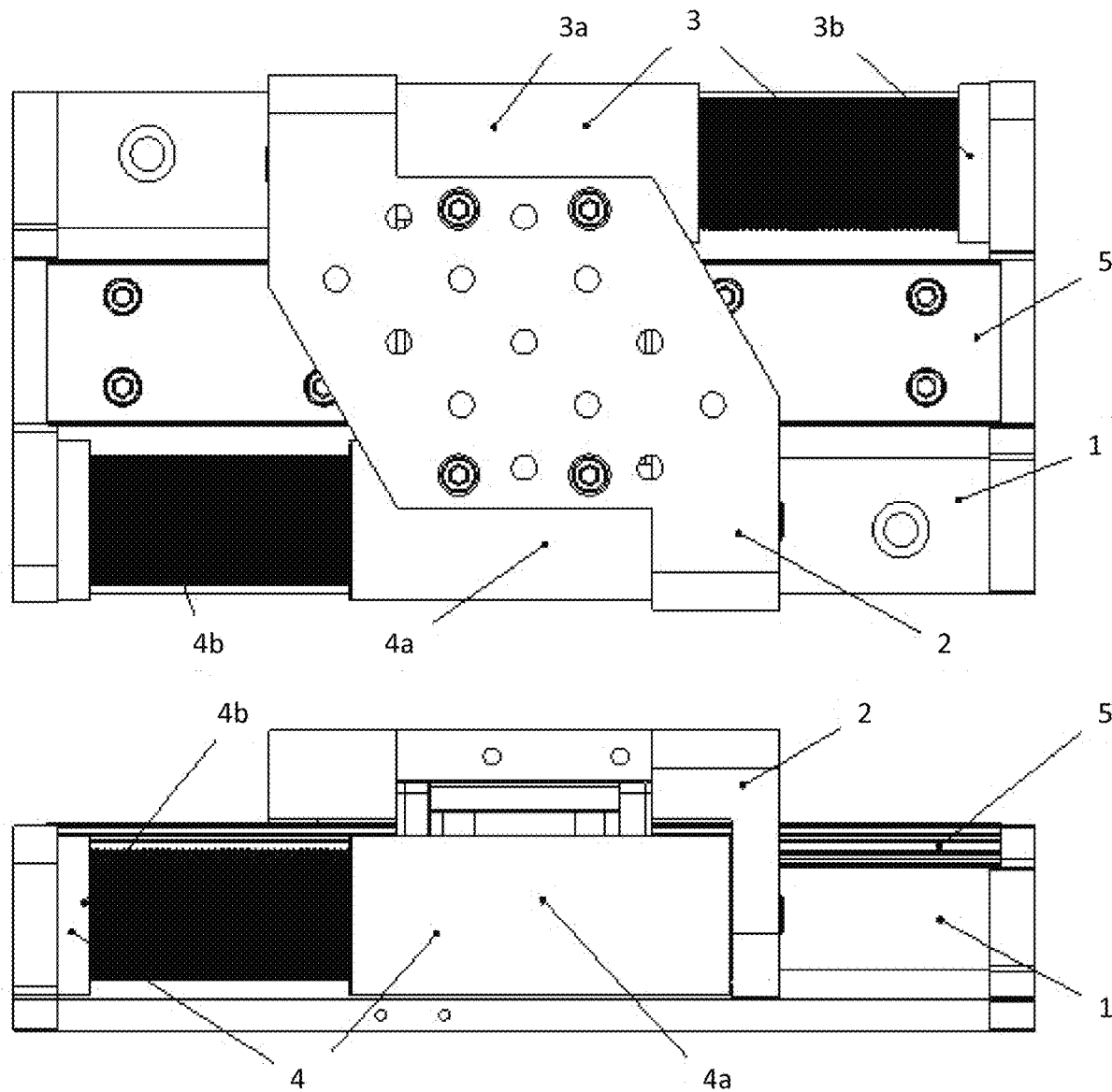
FIG. 5 shows the plan view and side view of a voice coil driven translator device according to an embodiment.

FIG. 5 shows a voice coil driven translating device based on a dual voice coil design according to an embodiment. For clarity, this example embodiment includes two identical voice coil actuators. The translating device includes a fixed body (1), a moving body (2) and two or more linear voice coil actuators (3, 4). The actuators (3, 4) respectively include their moving parts (3a, 4a), and fixed parts (3b, 4b). The fixed part of the voice coil actuator may include an electromagnetic coil with a front side and a back side. The moving part of the voice coil actuator may be a magnet assembly that moves in and out from the front or open side of the coil.

The moving parts of the voice coil actuators (3a, 4a) are mounted to the moving body (2). The fixed parts of the voice coil actuators (3b, 4b) are mounted to the fixed body (1).

The orientations of the moving parts of the voice coil actuators (3a, 4a) are arranged so that they are parallel in the direction of motion, and they are also facing opposite directions along the axis of travel, so that the back side of the fixed part of one voice coil actuator (3b) shares the same plane as the front or open side of the fixed part of another one voice coil actuator (4b). Since the actuators are identical, it follows that the front or open side of the fixed part (3b) of the one voice coil actuator (3) shares the same plane as the back side of the fixed part (4b) of the other one voice coil actuator (4). The voice coil actuators (3, 4) are aligned and offset by a desired distance with their corresponding directions of motion of the moving sides (3a, 4a) so that their moving actions are not limited or interfered by each other, and thus the telescoping action of the actuator is achieved. The minimum offset would be the arrangement where the actuators are touching each other. This arrangement provides an additional space saving in the transverse direction.

In one embodiment, a voice coil translation stage is configured with an arrangement of voice coil actuators, such that the translation range of the stage exceeds the distance of the length of any one of the plurality of actuators and the total length of the stage is less than a similar stage where the plurality of actuators are all oriented in the same direction.

In one embodiment, the fixed sides of the voice coil actuators (3b, 4b) are mounted to the fixed body (1) by the side opposite the corresponding moving voice coil actuator side. The total travel range of the device is the distance between the mounting surfaces for the moving part of the voice coil actuators (3b, 4b) minus the common length of the fixed part of the voice coil actuators (3a, 4a). This description ignores extra material mount and secure of the bodies involved.

FIG. 5 also shows a guide rail (5) coupled to the fixed body for guiding the motion of the translator. In one embodiment, the voice coil actuators are wired in series. In one embodiment, each of the voice coil actuators is independently powered and controlled. In one embodiment, the translator includes an encoder to provide position feedback.

While the present invention has been described at some length and with some particularity with respect to the several described embodiments, it is not intended that it should be limited to any such particulars or embodiments or any particular embodiment, but it is to be construed so as to provide the broadest possible interpretation in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

The invention claimed is:

1. A linear translator device, comprising:
   a moving body;
   a fixed body; and
   a plurality of actuators;
   wherein each actuator comprises a moving part mounted to the moving body, a fixed part mounted to the fixed body and a mount head, the fixed part having a front end and a back end, the moving part being configured to move in and out from the front end of the fixed part along a direction of motion, and the mount head being mounted to one end of the moving part that faces away from the fixed part;
   wherein the fixed part has a length of X, the moving part has a length of Y, and the mount head has a thickness of Z;
   wherein, in a fully collapsed state, each actuator has a first length (X+Z) along the direction of motion, and in a fully extended state, each actuator has a second length (X+Y+Z) along the direction of the motion;
   wherein the plurality of actuators are arranged so that the direction of motion of the moving part of one of the plurality of actuators is offset, parallel and opposite to that of another one of the plurality of actuators;
   wherein at least a portion of the fixed part of the one of the plurality of actuators parallel with the direction of motion overlaps with a portion of the fixed part of the other one of the plurality of actuators parallel with the direction of motion;
   (a) in a case where the back end of the fixed part is outside the overlap portion, and in the fully extended state, the linear translator device has a length of X+2Y+2Z−W; and
   (b) in a case where the front end of the fixed part is outside the overlap portion, and in the fully extended state, the linear translator device has a length of X+2Y+2Z+W.

2. The device of claim 1, wherein the plurality of actuators are voice coil actuators, and each voice coil actuator comprises a permanent magnet assembly and an electromagnetic coil.

3. The device of claim 2, wherein the plurality of actuators are connected in series.

4. The device of claim 2, wherein the plurality of actuators are independently wired to their respective current sources.

5. The device of claim 1, further comprising an encoder configured to provide position feedback of the motions of the actuators.

6. The device of claim 1, wherein the front end of the fixed part of the one of the plurality of actuators shares a same plane as the back end of the fixed part of the other one of the plurality of actuators.

7. The device of claim 1, wherein the back end of the fixed part of the one of the plurality of actuators shares a same plane as the front end of the fixed part of the other one of the plurality of actuators.

* * * * *